United States Patent
Schmidt

[15] 3,685,860
[45] Aug. 22, 1972

[54] HOSE COUPLING
[72] Inventor: Adam M. Schmidt, Euclid, Ohio
[73] Assignee: The Weatherhead Company, Cleveland, Ohio
[22] Filed: Jan. 5, 1971
[21] Appl. No.: 104,029

[52] U.S. Cl............................285/249, 285/328
[51] Int. Cl..............................F16l 33/00
[58] Field of Search......285/249, 248, 242, 243, 244, 285/245, 246, 247, 250, 174, 341, 382.7, 374, 399, 328

[56] References Cited

UNITED STATES PATENTS

| 3,158,388 | 11/1964 | Marshall | 285/242 X |
| 2,500,720 | 3/1950 | Heem | 285/328 X |
| 2,309,596 | 1/1943 | Johnson | 285/382.7 X |
| 2,470,546 | 5/1949 | Carlson | 285/382.7 X |
| 3,493,250 | 2/1970 | Hertel | 285/249 |

FOREIGN PATENTS OR APPLICATIONS

| 1,146,673 | 3/1969 | Great Britain | 285/341 |
| 90,969 | 2/1958 | Norway | 285/249 |

Primary Examiner—Dave W. Arola
Attorney—McNenny, Farrington, Pearne & Gordon

[57] ABSTRACT

A compression type end fitting assembly for flexible tubing comprising body, nut, and sleeve assembly parts, and a tube reinforcing insert positionable in the body, before joinder of the tubing and the fitting, to simplify final assembly procedures. The insert is releasably retained in the body to permit the tube to be disassembled from the body upon release of the insert when the tube and insert are interlocked by compression of the sleeve. A deformable tubular insert design permits the insert to be secured by an adequate interference fit in a bore of the body and to be readily released therefrom regardless of relatively large dimensional variations in manufacture.

6 Claims, 4 Drawing Figures

PATENTED AUG 22 1972
3,685,860
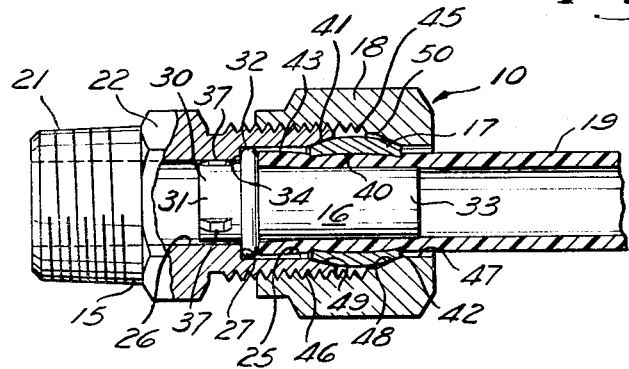
Fig. 1
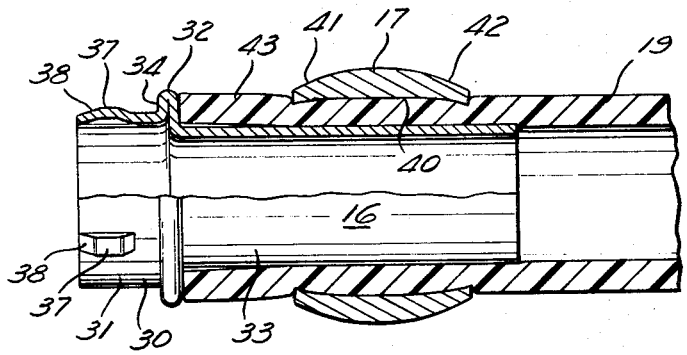
Fig. 2
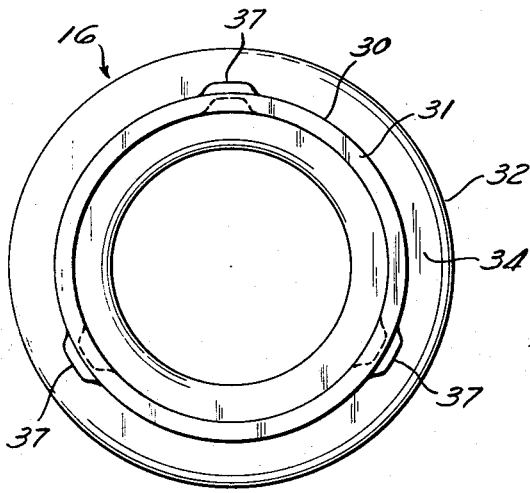
Fig. 3
Fig. 4
INVENTOR.
ADAM M. SCHMIDT
BY
McNENNY, FARRINGTON, PEARNE & GORDON
ATTORNEYS

HOSE COUPLING

BACKGROUND OF THE INVENTION

This invention relates generally to hose couplings and, more specifically, it concerns reuseable hose end fittings for flexible tubing.

A hose coupling as provided by this invention is particularly suited, although not limited, for use with relatively soft hose such as thermoplastic tubing employed in automotive air brake lines. One of the more common arrangements for connecting plastic pressure tubing uses an external ring or sleeve in compression around the exterior of a tube end to provide a fluid seal between the sleeve and the tube. Where the tubing is relatively soft or deformable it has been the practice to provide radial support for the tube in the area of the compression sleeve to effect a tight seal.

In the known prior art, this radial support has been provided by tubular structures receivable in the interior of the tube. One type of such structure comprises a cylindrical insert installed in the tube before the tube is positioned in a coupling body. This arrangement has the disadvantage of requiring extra steps in assembling the tube to the coupling body. It first requires the insert to be separately handled and positioned within the tube end and, then, requires the assembled insert and tube to be positioned in the coupling body. The handling and installation of a separate insert is inefficient and therefore undesirable in high production assembly line operations.

Also known in the prior art are coupling arrangements providing internal tube support by means of a tubular extension permanently fitted with the main coupling body. This type of construction makes separation and reuse of certain of the coupling members impossible, or nearly so, when the compression sleeve or tube or both have been permanently deformed to cause radial interference and interlocking with the tubular extension of the coupling body.

SUMMARY OF THE INVENTION

A reuseable coupling as provided by this invention includes an improved tube reinforcing insert adapted to be releasably secured within the coupling body before shipment to the user. In the illustrated form, the insert comprises first and second cylindrical portions joined by an intermediate radial shoulder or rib. The first insert portion is dimensioned for an interference fit with a corresponding bore in the coupling body to permit the insert to be releasably carried in the body. The second portion of the insert is held concentrically within the coupling body by the first portion to permit a tube end to be slipped over the second portion and to be inserted in the coupling body.

Since the insert and body are preassembled before shipment to the user, the number of assembly steps required of the user is reduced. The insert need not be separately handled and installed in the tube before the tube is positioned in the coupling body. Further, the invention reduces the chances of inadvertent omission of the insert during final assembly since the user is not required to separately handle and install the insert.

During disassembly, the tube is easily removed from the coupling body without unnecessary labor or destruction of the tube or coupling members. Although the insert may be locked within the tube by permanent radial compression of the sleeve, the tube is readily released from the coupling body as a permanent assembly with the insert and compression sleeve. These assembled members may subsequently be reused with the coupling body without modification.

In the preferred embodiment, the first portion of the insert is generally in the form of a circular tube having angularly disposed radial projections on the periphery thereof. These projections permit relatively large production tolerances or variations in both the diameter of the insert and the internal diameter of the associated body bore. The cost of production of the coupling is thereby minimized while satisfactory fits between inserts and coupling bodies are maintained. Further, the projections facilitate the release of the insert and tube by enabling the insert to be rocked or walked out of the coupling body by flexing the tube.

A further advantage of the invention is improved resistance of the coupling against seal failure due to vibration. The insert prevents the tube from pivoting in the compression sleeve since the insert holds the portion of the tube inwards of the sleeve stationary.

BRIEF DESCRIPTION OF THE DRAWING

FIG. 1, is a longitudinal view, partially in cross section, of an assembled hose coupling embodying this invention.

FIG. 2, is a longitudinal cross-sectional view, on a somewhat enlarged scale, showing the tube reinforcing sleeve after disassembly of the coupling.

FIG. 3, is a front end view of the insert shown in a further enlarged scale.

FIG. 4, is a perspective view of another embodiment of the insert of this invention.

DESCRIPTION OF THE PREFERRED EMBODIMENT

Referring now to the figures, there is shown a hose coupling assembly or connector 10 comprising, as parts, a coupling body 15, a tubular insert 16, a compression sleeve 17, and a threaded nut 18. A tube or hose 19 is receivable within the coupling body 15 and cooperates with the coupling assembly parts to form a fluid tight connection therewith.

A free end 21 of the coupling or connector body 15 is provided with means, in the form of external tapered pipe threads, to connect the coupling assembly 10 to a source or sink of fluid. The coupling body 15 is provided with wrench flats 22 on its exterior enabling it to be turned into a mating body (not shown) and to be subsequently held from rotation when the threaded nut 18 is tightened or removed from it. The coupling body 15 is formed with a first longitudinal cylindrical bore 25 adapted to receive the tube 19 and the insert 16. This first bore 25 forms a counterbore of a second or inner cylindrical through bore 26 which has a smaller diameter than the first bore 25 and which defines the axis of the coupling body 15. The inner end of the first bore 25 terminates at an annular surface or shoulder 27 extending generally radially inward from the first bore 25 to the inner bore 26.

The insert or eyelet 16 is adapted to be releasably retained in the coupling body 15 prior to insertion of the tube 19 in the body 15. The tubular insert 16 comprises a first portion 31 at one end, an intermediate radial shoulder or rib 32, and an elongated cylindrical portion 33. As seen most clearly in FIgS. 2 and 3, the insert 16 may be formed or stamped form a tubular blank. When thus produced, the radial shoulder 32 may be formed of a double layer of material folded back on itself in the form of a head.

The first portion 31 of the insert 16 is formed to provide an interference fit with the inner bore 26 of the coupling body 15. Preferably, the first portion 31 of the insert includes a cylindrical structure 30 having an outer diameter somewhat smaller than the diameter of the inner bore 26. An interference or press fit between the first portion 31 of the insert 16 and the coupling body 15 is provided by means of a plurality of radially extending raised projections 37. The projections 37 are preferably formed by stamping or raising material radially outward from the outer surface of the cylindrical structure 30 of the first portion 31.

The projections 37 are equally spaced about the outer periphery of the cylindrical structure 30 of the first portion 31. The projections 37 normally, when not constrained, define the circumference of a circle which is concentric with the axis of the insert 16 itself and which is larger than the diameter of the inner bore 26 of the coupling body 15. This construction of the first portion 31 of the insert 16 permits it to yield in shape as it is inserted into the inner bore 26 of the coupling body 15. This feature allows relatively large dimensional tolerances to be used in the manufacture of the insert 16 and the body 15 while preventing excessively loose or tight fits between these members. The projections 37 are displaced radially inward while intermediate areas of the cylindrical structure 30 of the first portion 31 are simultaneously forced radially outward. Outward movement of these intermediate areas of the cylindrical structure 30 is unrestrained since the outer diameter of the cylindrical structure is less than the diameter of the inner bore 26. As a result, the insert 16 is releasably held and concentrically aligned with the axis of the coupling body 15. Although not illustrated, the projections 37 may be provided in the form of longitudinal ribs extending the full length of the first portion 31 of the insert 16 for purposes of improved alignment of the insert in the coupling body 15.

When the tubular insert 16 is in full engagement with the coupling body 15, the first portion 31 of the insert lies entirely within the inner bore 26 and a leading face 34 of the radial shoulder 32 abuts the radial surface 27 at the base or inner end of the counterbore 25. Leading edges 38 of the radial projections 37 may be beveled to facilitate insertion of the first portion 31 of the insert 16 into the inner bore 26 of the coupling body. The major diameter of the insert 16 is defined by the radial shoulder 32. It is desirable that the outer diameter of this shoulder 32 be smaller than the diameter of the counterbore 25, so that the shoulder is readily receivable in the counterbore without interference.

The elongated cylindrical portion 33 of the insert 16 defines, with the surrounding area of the counterbore 25, an annular recess into which an end 43 of the tube 19 is inserted. The outer diameter of the elongated cylindrical portion 33 of the insert 16 is substantially equal to the nominal or initial inside diameter of the tube 19 so that the tube end 43 may be readily slipped onto the projecting or outer end of the elongated cylindrical portion.

The compression sleeve or ring 17 is conventional in design and includes a through bore 40 and conical or tapered outer surfaces 41 and 42 at its leading and trailing ends, respectively. The initial diameter of the sleeve bore 40 is slightly greater than the nominal outside diameter of the tube 19 to permit the sleeve 17 to be readily positioned over the end 43 of the tube 19. The invention is not limited to use with the type of sleeve illustrated but, rather, may be used successfully with various other types of sleeves such as that disclosed in U.S. Pat. No. 2,873,985. A conical surface 49 is formed at the entrance or outer end of the counterbore 25 in the coupling body 15 to receive the leading end surface 41 of the compression sleeve 17 when the coupling 10 is assembled.

The coupling nut 18 is provided with internal threads 45 engageable with external threads 46, concentric with the counterbore 25, formed on the exterior of the coupling body 15. The end of the nut 18 opposite the internal threads 45 is perforated with a clearance hole 47 permitting the nut 18 to be slipped over the end 43 of the tube 19. The clearance hole 47 terminates within the nut 18 at a flared or conical surface 48 extending radially outward and axially inward from the hole 47 towards the internal threads 45. Together, the internal threads 45 and the conical surface 48 define a recess 50 in the nut 18 adapted to receive the sleeve 17 while the nut 18 is positioned on the body 15. The nut 18 may be machined from hexagonal bar stock so that the exterior of the nut 18 will be provided with wrench flats (not shown) to permit it to be tightened onto the body 15.

As mentioned, the insert 16 is preassembled or inserted in the coupling body 15 before the coupling parts are shipped to the user. Thus, the insert 16 need not be separately handled before the tube 19 is inserted into the counterbore 25 of the coupling body 15. The number of coupling parts which must necessarily be handled during final assembly is thereby minimized.

To effect a connection between the tube 19 and the coupling body 15, the nut 18 and then the compression sleeve 17 are first slipped over the end 43 of the tube 19. The end 43 of the tube 19 is then positioned over the outward end of the elongated cylindrical portion 33 of the insert 16 which extends out of the conical opening 49. The tube 19 is pushed axially into the counterbore 25 of the coupling body 15 until the forward end face of the tube 19 abuts the radial shoulder 32 of the insert 16. The nut 18 is slipped forward over the tube 19 until it engages the adjacent threaded end of the coupling body 15. The nut 18 is then rotated to threadingly engage the coupling body 15 until the compression sleeve 17 is axially bound between the opposing conical surfaces 48 and 49 of the nut 18 and coupling body 15 respectively. As the nut 18 is further tightened onto the coupling body 15, the nut drives the compression sleeve 17 forward into further engagement with the conical surface 49 of the body 15.

The forward or axial movement of the nut 18 relative to the coupling body 15 causes the surfaces 41 and 42 of both the leading and trailing ends of the compression sleeve to be cammed radially inward by the engaged conical surfaces 48 and 49 of the nut and body to constrict the sleeve bore 40 against the outer circumference of the tube 19. The compression sleeve 17 when thus constricted mechanically locks the tube 19 to the coupling assembly 10 and forms a fluid tight boundary around the periphery of the tube 19.

Fluid is contained within the bores 25 and 26 of the coupling body 15 and the interior of the tube 19 by sealing engagement between the sleeve bore 40 and the exterior surface of the tube 19 and sealing engagement between the outer surface 41 of the leading end of the sleeve 17 and the conical camming surface 49 at the outer end of the counterbore 25. The tube end 43 is rigidly supported by the elongated cylindrical portion 33, of the insert 16 since the insert 16 is press fitted in the body 15. This support prevents the tube from pivoting in the compression sleeve and thereby improves the resistance of the coupling against vibrational failure.

This coupling is particularly useful with thermoplastic tubing either of the plain extruded uniform wall type or multilayer braided construction which has now gained considerable acceptance for use in automotive and similar applications, particularly for air brake lines and low pressure hydraulic systems. Tubing of this type has strength characteristics which are highly favorable as to burst strength, but it is relatively weak when subjected to compressive forces, such as may be produced by twisting or flexing the tubing. For this reason, the use of tubing of this type with a coupling which applies compressive forces to the tube to effect the necessary gripping and sealing engagement tends to be ineffective if the tubing does not have sufficient radial strength to allow this action to take place. Thus, the insert of this invention allows this type of tubing to be used with various couplings which have attained a high degree of acceptance with more rigid metal tubing without changing the construction of the various coupling members. The support or insert 16 prevents radial collapse or unrestricted yielding of the tube under the compressive forces which are necessary to develop adequate sealing contact and to mechanically prevent the tube 19 from pulling out of the body 15. As shown in FIG. 1, the elongated cylindrical portion 33 of the insert 16 extends axially outward from the counterbore 25 through the conical opening 49 and somewhat beyond the area of the tube 19 encircled by the sleeve 17. The support provided by the insert 16 against radial compression of the tube 19 insures a tight seal between the circumference of the tube and the bore 40 of the sleeve 17. The insert 16 is preferably formed of a metal, such as brass, to provide sufficient rigidity.

To form an effective and permanent seal and to mechanically lock the tube in coupling assembly 10, the compression sleeve 17 may also be formed of a metal or other material harder than the material of the tube. In most instances, the compression sleeve 17 will be plastically deformed or compressed around the circumference of the tube 19 and the insert 16 when the coupling nut 18 is fully tightened. The effect of this plastic or permanent deformation of the compression sleeve 17 is to lock the tube 19 onto the insert 16 even after the nut 18 is removed from the body 15.

FIG. 2 shows the condition of the compression sleeve 17, the tube 19, and the insert 16 after being sealed in the coupling body 15. The sleeve 17 has tightly constricted the tube 19 about the circumference of the insert 16. Removal of the tube from the insert may be extremely difficult if not impossible without cutting away and thereby destroying the sleeve 17 and the end 41 of the tube 19. The releasable engagement or press fit of the insert 16 in the coupling body 15, nevertheless, permits the coupling assembly 10 to be disassembled and the tube 19 to be removed from the coupling body 15.

The tube 19 is removed from the coupling body as an assembly with the compression sleeve 17 and the captured insert 16. Withdrawal of tube 19 is facilitated by the cylindrical structure 30 of the first portion 31 of the insert 16. With the nut 18 removed, the tube 19 may be flexed to cause the cylindrical structure 30 carrying the projections 37 to deform and thereby permit the insert 16 to be walked or rocked out of the coupling body 15. The assembly of the sleeve 17, tube 19, and insert 16 may be reused with the coupling body 15 and nut 18. The assembly is simply pushed into the coupling body 15 until the forward face 34 of the insert shoulder 32 abuts the radial surface 27 at the base of the counterbore 25. The nut 18 may then be retightened onto the coupling body 15.

FIG. 4 illustrates another embodiment of the tubular reinforcing insert in accordance with the invention. The insert, designated 56, has the same general configuration as the previously described insert 16 and may be used in substantially the same manner as described. The insert 56 comprises a first tubular portion 57, an intermediate shoulder or rib 58, and a second tubular portion 59. As before, the first tubular portion 57 is adapted to be inserted into the inner body bore 26, the intermediate rib 58 is preferably slightly smaller in diameter than the body counterbore 25 to facilitate insertion therein, and the second tubular portion 59 is cylindrical and has an outer diameter substantially equal to the nominal inside diameter of the tube 19.

The first portion 57 of the insert 56 may be produced by initially forming it into a cylinder having an outer diameter less than the diameter of the first or inner bore 26 of the body 15 and then bumping or permanently deforming the first portion 57 into an oval or elliptical shape with the exterior dimension on the major axis of the ellipse, when unrestrained, being greater than the diameter of the inner bore 26. The first portion 57 is symmetrical about the axis of the insert 56. The lead end, designated 61, of the first portion 57 may be beveled radially inward to insure that, along the major axis, it is slightly smaller than the body bore 26 to facilitate its insertion.

This second embodiment of the insert 56 shares with the first described insert 16 the feature that the outermost surface areas of each lie in fractional or limited segments of a circle which they define and which is greater in diameter than the inner body bore 26. These outermost surface areas are defined by the projections 37 on the first insert 16 and the ellipse ends, designated 62, on major axis of the first portion 57 of the insert 56. It is this feature which permits relatively great dimensional variations in the manufacture of both the body 15 and either of the inserts 16 and 56 while retaining a relatively low and constant releasable holding force or press fit. A tubular configuration which permits segmental engagement with an internal bore of the body tolerates relatively large dimensional variations in the manufactured parts without producing excessively tight or loose fits since the fitted portion of the insert is capable of bending or deflecting in local areas. Such bending or deflecting would not occur if the fitted portion had a simple circular or cylindrical shape which would require uniform radial compression of all of the tubing material in the fitted area.

The foregoing description is necessarily detailed in character so that the invention may be completely set forth, but it will be understood that modifications may be made in its construction and details without departing from the principles and spirit of the invention.

What is claimed is:

1. A hose coupling assembly comprising a body having a bore extending axially therethrough, said body having an enlarged counterbore at one end of said bore and defining a shoulder at the junction of said bore and said counterbore, a hose having an outer diameter arranged to be freely received within said body counterbore, a nut having an aperture adapted to receive the hose therethrough, screw means on said body and said nut adapted to provide threaded engagement therebetween, a coupling sleeve having a bore therethrough adapted to receive said hose, means on said sleeve and on said body and on said nut cooperatively arranged whereby relative movement with threaded engagement of said nut and said body toward each other causes said sleeve to sealingly engage said body and at least one portion of said sleeve to constrict radially inward to bite into and grip the outer surface of said hose, and a tubular insert having a first end forming a cylindrical portion with an outer diameter substantially equal to the nominal inside diameter of the hose, radial abutment means on said insert limiting axial inward movement of said insert in said body by abutment therewith, and a second insert portion being receivable within said enlarged counterbore, said second portion having exterior radially outer surface portions defining a circle greater in diameter than one of said body bores when unrestrained and having exterior radially inner surface portions, said second portion releasably positioned within said one bore with said radially outer surface portions being resiliently deflected radially inward by bending of said exterior radially inner surface portions to segmentally engage the wall of said one bore.

2. A coupling as set forth in claim 1 wherein said second portion of said insert is proportioned to provide a releasable press fit with said axial body bore.

3. A coupling as set forth in claim 2 wherein said second portion has wall portions defining a first diameter substantially less than the diameter of said axial body bore and said second portion has wall portions defining an external diameter slightly greater than the diameter of said axial body bore to radially position said second end portion of said insert within said axial body bore and provide said releasable press fit.

4. A coupling as set forth in claim 1 wherein said radial abutment means is intermediate said first and second portions and has one side engageable with the end of the hose on the side adjacent said first portion and has another side adapted to bear against said shoulder.

5. A hose coupling assembly comprising a coupling body having a circular inner bore defining an axis of the coupling, said coupling body having a second circular bore of larger diameter than said inner bore and coaxial with said inner bore, said second bore terminating at its inner end at an annular radial surface extending radially inward from said second bore to said inner bore, said second bore terminating at its outer end at a conical surface of said coupling body extending radially and axially outward from the second bore, said second bore adapted to receive an end of a tube therein, an annular sleeve having a through bore with an initial diameter substantially equal to the nominal outer diameter of the tube to permit it to be slipped over the tube end before the tube end is inserted in said second bore, said sleeve having an end engaging said conical surface of said coupling body when said tube is positioned in said second bore, said coupling body having external threads extending along its outer periphery concentric with said second bore, a nut having internal threads engageable with the external threads of said coupling body, said nut having a perforation therein permitting it to be slipped over the tube end prior to the placement of the sleeve on said tube, said nut having an internal recess therein permitting said sleeve to be received within said nut while said nut is threaded onto said coupling body, said nut providing a surface engageable with a portion of said sleeve allowing said nut to drive said sleeve axially forward as it is threaded onto said coupling body, said conical surface of said body camming said end of said sleeve radially inward as the sleeve is driven axially forward by said nut thereby causing said sleeve to sealingly engage said conical body surface and to radially compress said tube, and a tube reinforcing insert resisting radial compression of said tube, said insert adapted to be positioned in said coupling body before said tube is inserted in said second bore, said insert including a cylindrical tubular portion having an outer diameter substantially equal to the nominal inner diameter of the tube, said cylindrical portion extending axially outward from said second bore and said conical surface into an area of said tube encircled by said sleeve, said sleeve locking said tube on said insert when the sleeve is radially compressed, said insert including a radial shoulder extending radially outward from said cylindrical tubular portion and abutting said annular radial surface of said coupling body to axially locate said insert in said coupling body, said tubular insert having spaced points about its circumference normally defining a circle larger in diameter than the diameter of one of said body bores, said tubular insert releasably positioned within said one bore by inward radial deflection of said spaced points by bending of adjacent areas of the insert to provide segmental interferring engagement in said one bore, release of said insert from said coupling body permitting said tube to be removed from said coupling body after said tube is locked onto said insert by said sleeve.

6. A hose coupling assembly comprising a body having a first cylindrical bore and a conical opening adjacent the outer end of said first bore, the conical opening extending radially and axially outward from a minimum diameter adjacent the outer end of the first bore, an inner bore coaxial and communicating with said first bore, said inner bore having a smaller diameter than said first bore, an annular radial surface extending radially inward from the inner end of said first bore to said inner bore, said first bore adapted to receive the end of a tube therein, an annular sleeve having a circular through bore, said sleeve bore having an initial diameter substantially equal to the nominal outer diameter of the tube to permit the sleeve to be positioned over the exterior of the tube end, said body providing external threads on its circumference concentric with said first bore, a nut having internal threads engageable with the threads of said body, said nut having an axial hole therethrough to permit it to be positioned over the tube end prior to the positioning of said sleeve on said tube, said nut having an internal recess enclosing said sleeve while it is threaded onto said body, said nut including an internal surface engageable with a portion of said sleeve to drive the sleeve inward along the axis of said first bore as the nut is turned onto said body thereby causing a portion of said sleeve to sealingly engage said conical opening, said conical opening camming said portion of said sleeve radially inward as said nut urges said sleeve into engagement with said conical opening, a tubular insert, a first portion of said insert being releasably press fitted in said inner bore, said first portion having a cylindrical structure with an outer diameter smaller than the diameter of said inner bore, said first portion including a plurality of radial projections extending outward from said cylindrical structure and normally defining a diameter of a circle greater than the diameter of said inner bore to thereby cause interference with said inner bore when positioned therein by bending of said cylindrical structure, said first portion concentrically supporting a second portion of the insert within said first bore, said insert having an intermediate radial shoulder between said first and second portions, said shoulder engaging said annular radial surface to axially locate said insert in said body, said second portion having an outer diameter substantially equal to the nominal inside diameter of the tube to permit the tube to be slipped over said second portion into said first bore and into engagement with said radial shoulder, said second portion of said insert extending axially outward from the first bore into said conical opening and the area of the tube encircled by said sleeve, said sleeve radially compressing the tube as it is cammed radially inward, said second portion of said insert supporting said tube against substantial radial compressive deformation to thereby insure fluid tight sealing engagement between said sleeve and said tube, said tube being radially compressed into interlocking engagement with said second portion of said insert when said sleeve is permanently radially deformed, release of said first portion of said insert from said inner bore permitting removal of said tube from said first bore, said tube being removable with said insert and said sleeve as a reuseable assembly.

* * * * *